United States Patent [19]

Herring et al.

[11] 4,005,387
[45] Jan. 25, 1977

[54] COMPUTER CONTROL SYSTEM

[75] Inventors: William M. Herring, Campton Township, Kane County; Dennis B. Walling, Darien, both of Ill.

[73] Assignee: Standard Oil Company, Chicago, Ill.

[22] Filed: Dec. 22, 1975

[21] Appl. No.: 643,350

Related U.S. Application Data

[63] Continuation-in-part of Ser. No. 514,495, Oct. 15, 1974, Pat. No. 3,968,487.

[52] U.S. Cl. .......................... 340/172.5; 235/151.1
[51] Int. Cl.² ..................... G06F 15/46; G06F 3/00
[58] Field of Search ........ 340/172.5, 163 R, 147 R; 235/151, 151.1, 151.11; 318/591, 569

[56] References Cited

UNITED STATES PATENTS

| 3,611,311 | 10/1971 | Andrews | 340/172.5 |
| 3,800,288 | 3/1974 | Russell | 340/172.5 |

Primary Examiner—Gareth D. Shaw
Assistant Examiner—James D. Thomas
Attorney, Agent, or Firm—Claron N. White; Arthur G. Gilkes; William T. McClain

[57] ABSTRACT

During the use of process equipment it is necessary to position control valves, change analog set-point signals for process controllers, move thermocouples to specific positions in thermowells, etc. A computer control system for these operations utilizes binary information on three sets of bits of a bus and an execute signal on another bit provided by a computer, usually at a remote area, to select the device of the equipment to be changed and to make the change. The system includes: an information interface card; a number of actuator module cards; decoder/demultiplexer means; and device select means. The interface card is connectable to first and second sets of bits of a bus that is connectable to additional systems. The device select means is connected to a third set of bits of the bus. The binary information to the device select means results in a signal only at one of its outputs, each output being connected to a different system. For the computer control system that output is connected to the input of first inverter means on the interface card. Second inverter means on the interface card is connectable to that another bit of the bus to receive the execute pulse to initiate the operation of the system, if selected by the device selector means. First and second gate means on the card have for each a number of gates with first and second inputs and an output. Means connected to these first inputs of the first and second gate means are connectable to different bits of the first and second sets, respectively, of bits of the bus. The second inputs of the first and second gate means are connected to the output of the first inverter means to open the gates when that inverter means is provided the device select signal. The inputs of the decoder/demultiplexer are connected to the outputs of the gates of the second gate means. Each actuator module card includes: storage buffer means having inputs corresponding in number to the number of gates of the first gate means, a corresponding number of outputs, and an additional input to receive a load signal to provide at those outputs retained binary information corresponding to the signals at the outputs of the gates of the first gate means at the completion of the load signal; means responsive to binary information at the outputs of the storage buffer means to provide at least one signal to change the operation of a device of the process equipment; a gate; and additional inverter means having an input and having its output connected to an input of the gate, while the output of the gate is connected to the load input of the storage buffer means. Another input of that gate on each module card is connected to the output of the second inverter means on the interface card to provide a load signal to the storage buffer means, when the additional inverter means of that card is signalled by the decoder/demultiplexer means to signal the means to change the device of the process equipment. The additional inverter means have their inputs connected to different outputs of the decoder/demultiplexer means.

16 Claims, 7 Drawing Figures

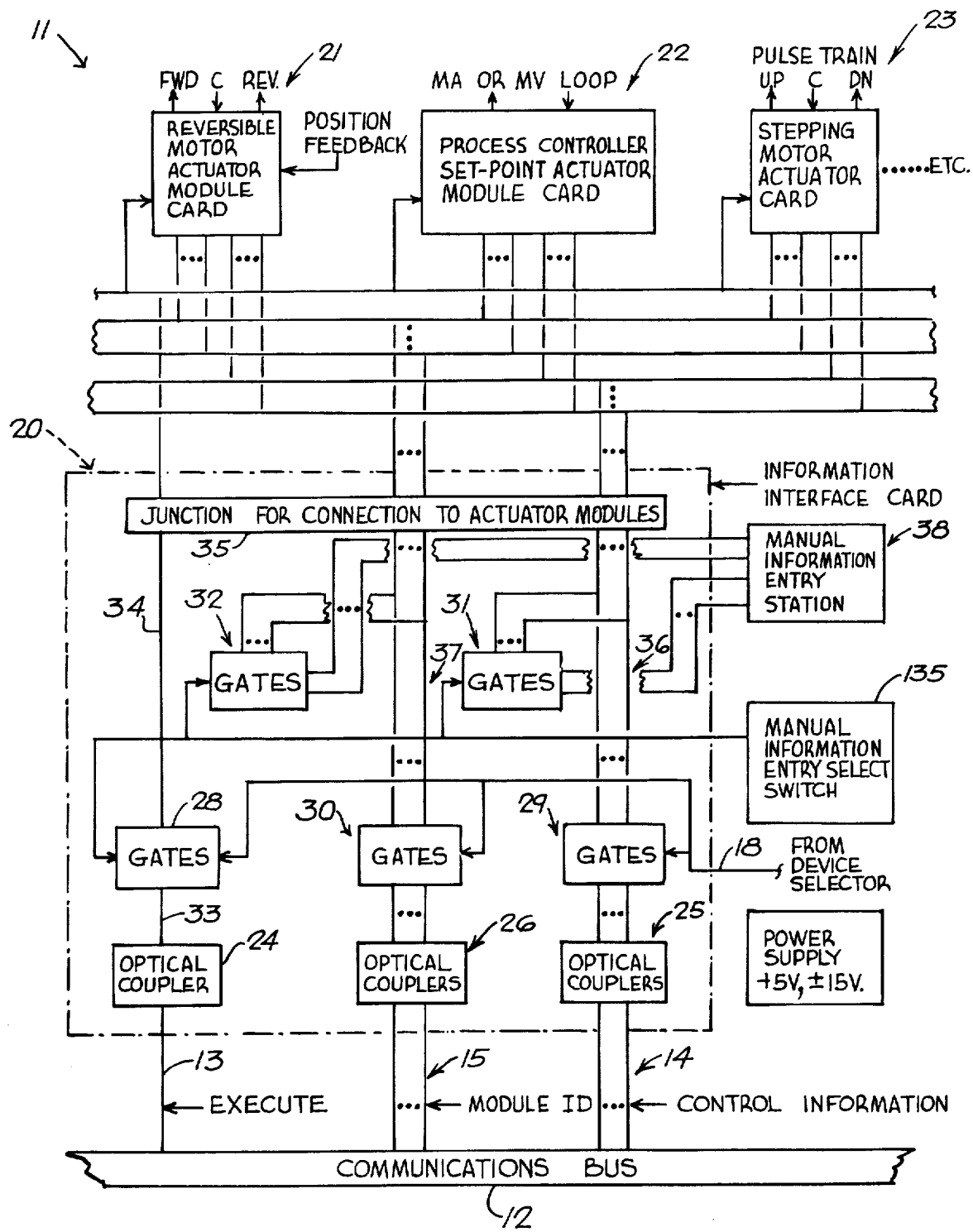

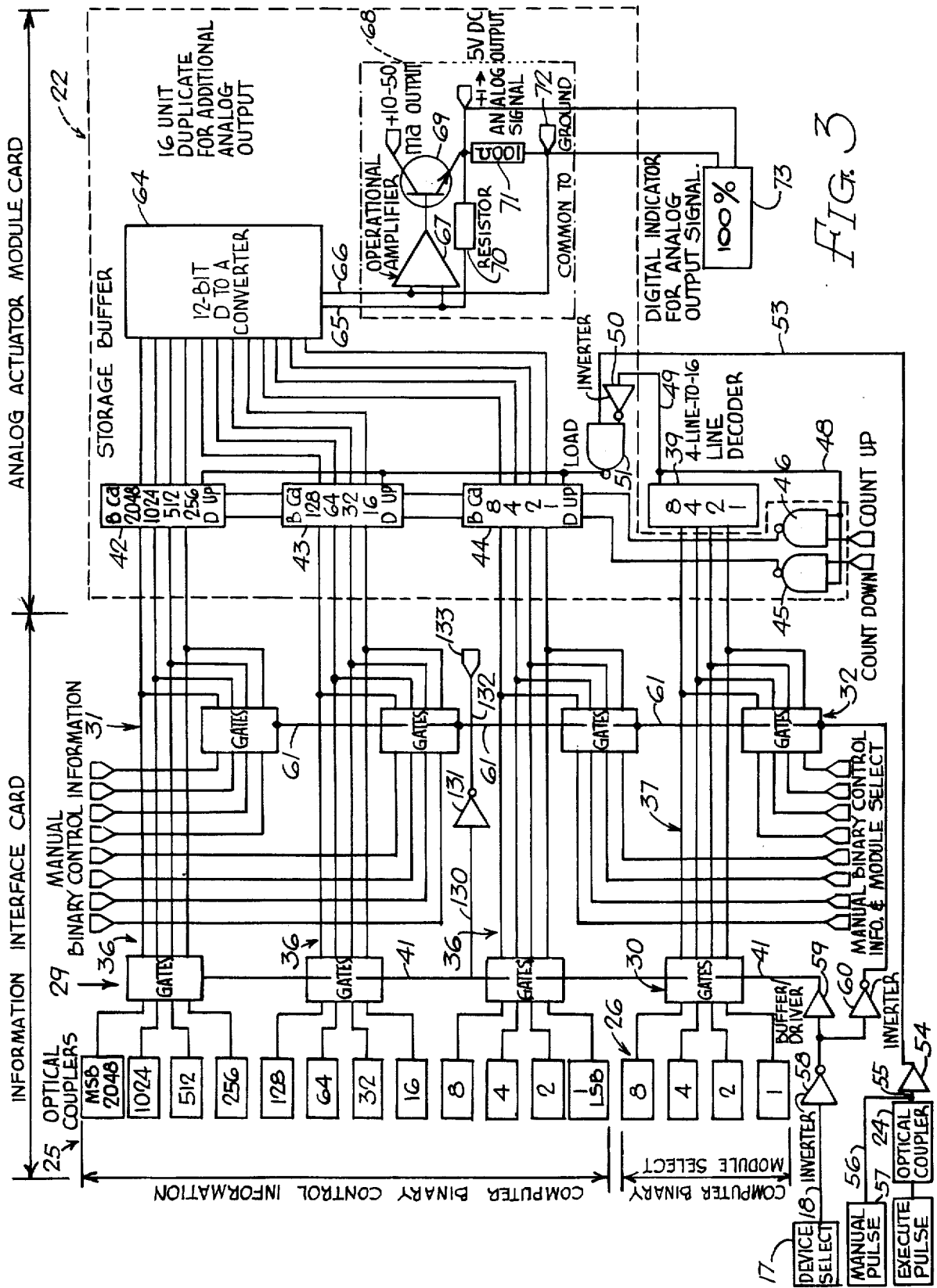

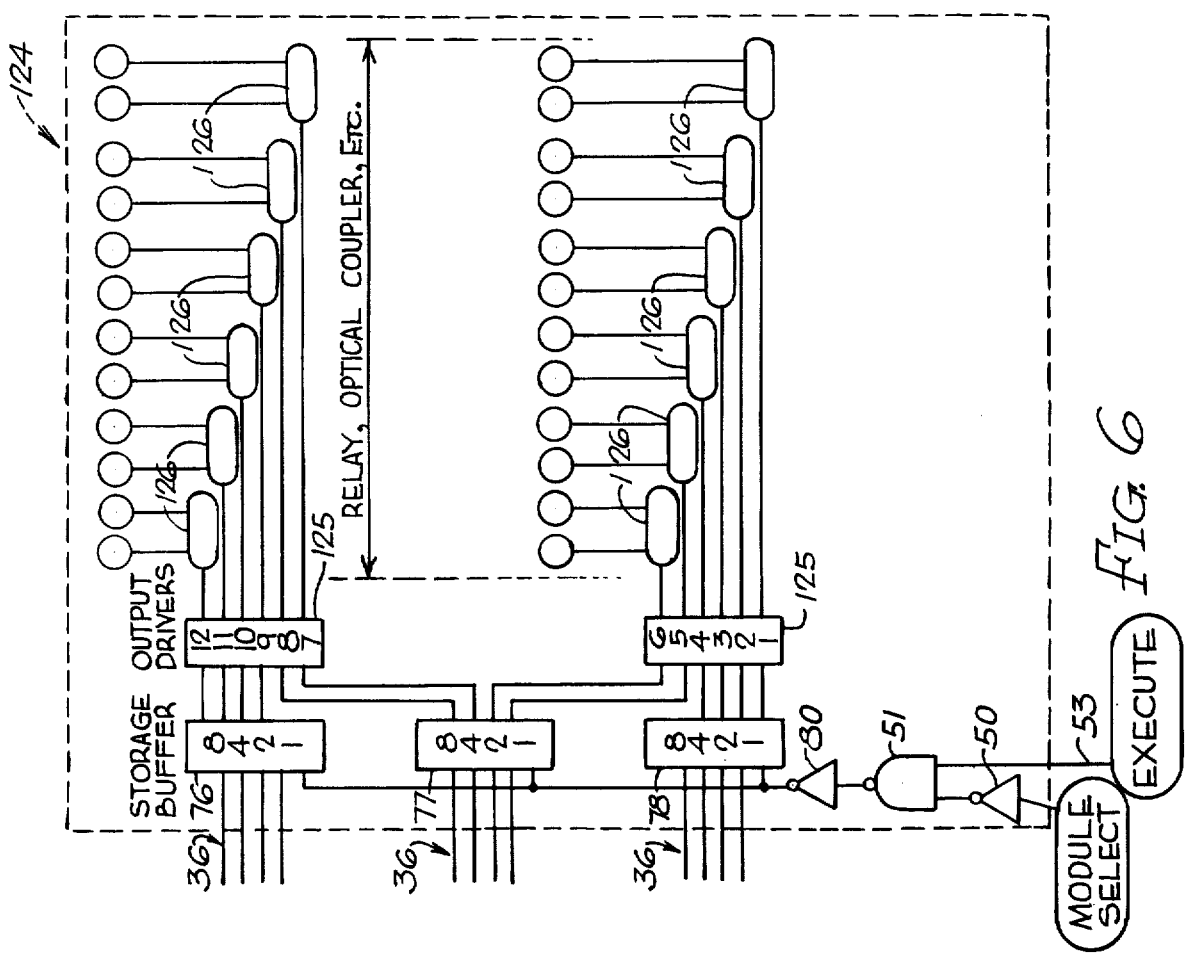

COMPUTER CONTROL SYSTEM

This patent application is a continuation-in-part of said patent application Ser. No. 514,495 now U.S. Pat. No. 3,968,487.

CROSS-REFERENCE TO RELATED APPLICATIONS

Our copending patent applications Ser. No. 500,321 and Ser. No. 514,495, entitled Multi-Counter Register and Multiplexer-Analog/Digital Conversion System that were filed on Aug. 26, 1974, and Oct. 15, 1974, respectively, are related inventions for systems that can be connected to the same sets of bits of the bus to provide various functions.

These applications are now U.S. Pat. Nos. 3,967,095 and 3,968,487 respectively. Each system is connected to an output of the device select means that has each of its outputs connected to a different one of these systems located at the same general area. All three types of systems are also connected to the additional bit of the bus to receive an execute signal from the computer, that is received by all systems but is effective only for the system signalled by the device select means.

BACKGROUND OF THE INVENTION

1. Field of the Invention

This invention relates to electronic process control systems that use a digital computer and provide for the generation of an analog signal or digital signals that control the operation of devices of process equipment.

2. Description of the Prior Art

U.S. Pat. No. 3,760,374 describes conventional process control systems of the prior art and discloses the system of the patent that is stated in the abstract of the patent as follows: An electronic process control system including a digital computer, a computer interface that is easily replaceable in order to change computer types, a logic module for grouping the computer and controller signals and converting between digital and analog representations, and a control unit interface for generating analog signals for a control unit in response to computer commands and adapting the analog control unit to communicate with a digital computer. The computer interface in the system of that patent is designed for each type of computer and is required to rearrange the computer output into a format required by the invention of that patent. The computer interface receives digital data from the computer by a cable or bus and breaks the data into three digital words. The first word contains the required command instructions. The second word contains the address of one of 16 process control loops, each having a control unit interface. The third word contains the value of the change to be effected. The address word is decoded and the address line of the proper control unit interface is activated. The third or value word is handled either as an absolute position signal or incremental change depending upon the proper command instruction. If incremental, the value is used to generate a series of pulses which are passed on to the control unit interface. If absolute, the value is first related to the present value of the proper signal and the difference is converted into a series of pulses. The control unit interface, that is designed independently of the choice of the computer, is required to convert status and pulse signals to logic and analog voltages. Each control unit interface has a register for accepting the command instructions which are supplied in parallel to all control unit interfaces but only that control unit interface, that is activated, accepts the command instructions. The activated control unit interface converts the series of pulses into an analog value that is stored in a particular memory of that control unit interface for generating a set-point or an output signal. For additional systems of that patent there are additional computer interfaces with associated additional control loops and all computer interfaces are connected in parallel by the cable or bus to the computer and thus are connected to different bits or wires of the bus.

SUMMARY OF THE INVENTION

This invention relates to a computer control system that translates digital control information from an on-line computer into analog and/or digital signals that can perform a variety of operations of devices of process equipment. Examples of such operations are: providing the analog setpoint signal to a process controller for supervisory control without need for an intervening controller set-point station; driving a traveling thermocouple to specific positions in a reactor thermowell according to a pattern defined by a computer program; positioning a control valve for direct digital control; closing or opening relays to start or stop electrically-actuated devices. The computer control system can be located close to the devices of the process equipment that it serves and that equipment is generally remote from the computer. The system of the invention is compatible with and complementary to the systems described in our copending applications mentioned above. The present system uses the same sets of bits of the bus that provide digital information to these other systems, and uses the same device select means that activates or enables the other systems as determined by digital information on another set of bits of the bus, and uses the same another bit that provides the execute pulse to these other systems and to the present system to initiate a cycle of operation.

The computer control system of the invention includes in its especially preferred embodiment a construction that provides for a manual selection and entry of digital information to select an actuator module to receive digital information that is also manually selected and entered. In this embodiment the construction also includes means to provide, by manual operation, an execute signal to initiate the operation of the system to provide by the system the analog signal or digital signals for an operation of a control device that changes that device of the process equipment. In one aspect of this embodiment the construction of the circuitry provides for a lockout of the manual operation during the period of time that there is a cycle of operation of the system initiated by the computer. In another aspect of this embodiment the construction of the circuitry is such that in addition to means to provide a manual entry of digital information as signals, that operate one of the selected devices of the equipment, there is also means to override the signals that are provided by the computer for a computer operation of the system. In any event, this especially preferred embodiment permits local control and operation of the system to provide the various capabilities to operate devices of the process equipment, if there is an interruption of computer servicing of the system or if it becomes necessary to provide a manual intervention in the operation of one or more of the devices of the process equipment.

DESCRIPTION OF THE DRAWINGS

FIG. 2 is an electronic circuit diagram of the computer control system showing the interface card and various alternative actuator module cards of the system and showing also the circuitry for a manual operation of the system.

FIG. 3 is an electronic circuit diagram showing, in greater detail than shown in FIG. 2, the construction of the circuitry on the interface card and showing a construction of circuitry on an actuator module card that provides an analog output signal to a process controller for process equipment.

FIG. 6 is an electronic circuit diagram of a further alternative actuator card that includes on it alternative relays, optical couplers, etc., that are operated by the system to control other functions for the operation of process equipment.

DETAILED DESCRIPTION

Figure 1:
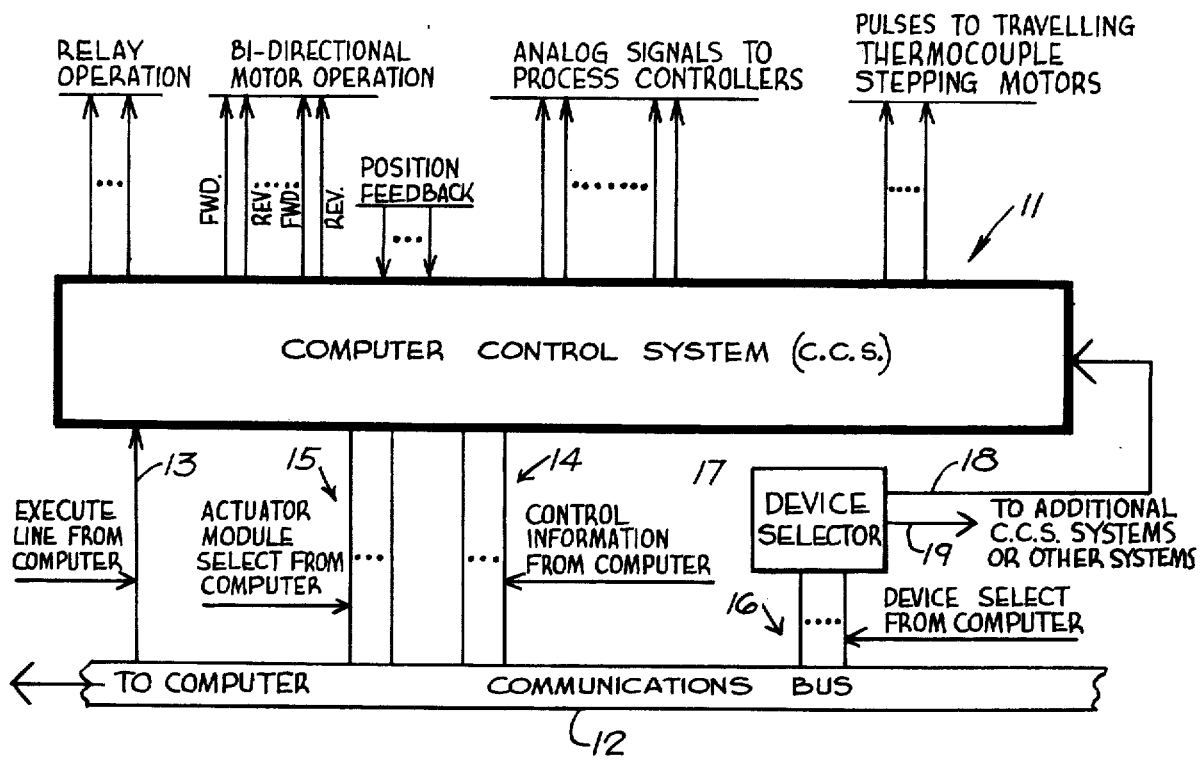
FIG. 1 is a block diagram showing the preferred embodiment of the computer control system and the device selector means connected to a communications bus, having one of the outputs of the device selector means connected to the system, and showing also the capability of the functions that the computer control system provides to devices that are a part of the process equipment and that are used to control the operation of the process equipment.

The computer control system of the invention that is illustrated in the drawings uses 21 bits of the digital information output channel of a communications bus connected to a computer, illustratively a Modcomp II minicomputer. The communications bus also has a digital information input channel generally having a number of bits. The systems of the two copending patent applications mentioned above use at least some of the same bits of the digital information output channel of the bus used by the system of the present invention and these systems use in common a number of bits of the digital information input channel.

The system of the present invention does not use the digital information input channel of the bus except when the system is modified to provide information to the computer of the status of the device of the process equipment. As stated earlier, 21 bits of the digital information output channel of the bus are used. The computer performs a control function by placing the following binary signals on the digital information output channel: 4-bit device ID; 4-bit control ID; 12-bit control information; and an execute bit.

Gates on an information interface card, described later, are opened by a signal from the device selector means to place the control information at the gates on each actuator module card. Decoder/demultiplexer means, described also later, is a module ID decoder. The execute signal is placed by the computer on the execute bit at the same time that the 4-bit device ID, 4-bit control ID, and 12-bit control information binary signals are placed by the computer on the other 20 bits of the digital information output signal. The execute signal is a pulse of about only 100 microseconds. When the computer removes this execute pulse, control action of the computer control system is initiated.

The 12-bit control information provides a resolution of 1 part in 4096. A common feature of all actuator modules is a storage register, i.e., storage buffer means, that holds the control information on the actuator module card until new information is gated from the information interface card. This construction eliminates a need for continuous communication of the computer control system with the computer; each control instruction requires only a very short period of communication, i.e., the period of the execute pulse, illustratively 100 microseconds as mentioned above. Furthermore, should the computer fail, its last instruction to each actuator module is stored in that module.

The digital information output channel of the bus comprises a number of twisted pairs of wires. One wire of each pair carries the information and the second wire of each pair is tied to the second wire of all other pairs in the channel and grounded to prevent crosstalk between information wires. The information input channel is present in the construction of the bus, such as when the bus is used also with other systems, such as described in said copending patent applications. For use of the bus with two or more systems of the present invention, the bus contains the output channel but the input channel is present if information is to be transferred to the computer. That input channel has the same construction of pairs of twisted wires. The bus also contains a ±5 $v$ logic level power supply line and a computer common line to ground potential. The wire of each pair that carries information is referred to, in the description that follows, as a bit. Thus the two channels of the bus are multibit channels.

As seen below in the detailed description of the preferred embodiment of the system of the present invention, it includes combinations of many electronic integrated circuits used for different functions. Most of these are TTL integrated circuits that are commercially available from a number of manufacturers. Illustrative are the TTL integrated circuits available from Texas Instruments Incorporated that designates these integrated circuits by type numbers such as SN7401. When a particular TTL integrated circuit is mentioned below it will be suitably identified by such type number that will appear in brackets immediately following the designation of the type of circuit.

Referring to FIG. 1, the computer control system generally indicated at 11 is connected to bits of a communications bus 12 by a line 13, lines generally indicated at 14, and lines generally indicated at 15. The lines 14 are connected to the 12 bits of bus 12 that carry the binary control information from the computer to system 11. The binary information represents the bits of a binary number from the least significant bit (LSB) up to the bit for 2048, which is the most significant bit (MSB). The lines 15 are 4 lines that receive binary information as bits 1, 2, 4 and 8 that provide for a selection of one of the actuator modules of system 11. Four other bits of bus 12 are connected by lines generally indicated at 16 to device selector means 17 that, based on the different binary information placed on those bits of bus 12 by the computer, provides a signal at different individual outputs. One of those outputs is connected by a line 18 to system 11. Other lines, represented by a line 19, are connected to the other outputs of device selector means 17 and each is connected to another system.

In FIG. 1 there are various sets of lines (not numbered) from system 11 to various devices of process equipment indicated by the legend appearing above those lines. The actual lines in a specific construction of the system, i.e., using specific actuator module cards, depends on the actuator cards that are used in the system and thus the system may have a number of actuator module cards of the same type or have a mixture of module cards of different types.

Referring to FIG. 2, it is seen that system 11 includes an information interface card generally indicated at 20 and illustratively three different types of actuator module cards along with an indication that there are more cards connected to information interface card 20. One type of actuator module card, that is shown, is generally indicated at 21. It is a reversible motor actuator module card. Another type, that is generally indicated at 22, is a process controller set-point actuator module card. The third type, that is shown, is generally indicated at 23. It is a stepping motor actuator card.

The interface card 20 is a printed circuit board having a large number of conducting lines printed on it. Some of these conducting lines extend to pins (not shown in FIG. 2) at the margin of the card to connect to lines 13, 14, 15 and 18 and to other lines connected to other components of the system that are described later.

Mounted on card 20 is an optical coupler 24, optical couplers generally indicated at 25 and optical couplers generally indicated at 26. All of these optical couplers have their inputs connected to lines that extend to pins to which line 13, individual lines of line 14 and individual lines of line 15, respectively, are connected. Each of these optical couplers and other optical couplers described below is an optical isolator that is a solid state device having a light-emitting diode and a transistor that is conducting when it receives a photon emitted by the diode. An illustrative optical isolator is optically-coupled isolator TIL 112.

Also mounted on card 20 are a gate 28, gates generally indicated at 29, gates generally indicated at 30, gates generally indicated at 31, and gates generally indicated at 32. One input of gate 28 is connected by a line 33 to the output of optical coupler 24. The outputs of optical couplers 25 are connected by lines (not numbered) to inputs of gates 29 while the outputs of optical couplers 26 are connected by lines (not numbered) to inputs of gates 30. These unnumbered lines from couplers 25 and 26 to gates 29 and 30 are shown individually in FIG. 3.

The output of gate 28 is connected by a line 34 that extends to a junction 35 that provides for connection of various lines from all of the gates to lines connected to the actuator modules on the various actuator module cards. The lines from the outputs of gates 29 and 30 are sets of lines that are indicated generally at 36 and 37. The outputs of gates 31 are connected by a set of lines (not numbered) that are connected to different lines of the set of lines indicated generally at 36. The outputs of gates 32 are connected by a set of lines (not numbered) that are connected to different lines of the set of lines indicated generally at 37. The inputs of gates 31 are connected by a set of lines (not numbered) to different outputs of a set of outputs of a manual information entry station generally indicated at 38. The inputs of gates 32 are connected by a set of lines (not numbered) to different outputs of a second set of outputs of station 38. These sets of lines include sets of printed conducting lines on card 20. The sets of lines on card 20, connected gates 31 and 32 to station 38, extend to pins (FIG. 3) at the margin of card 20 and, of course, lines from station 38 are connected to these pins (not numbered) to provide this connection between outputs of station 38 and gates 31 and 32, i.e., one input of each gate.

From the pattern of lines from junction 35 to actuator module cards it is seen that each actuator module on each actuator module card is connected to line 13 to receive an execute pulse when it is placed on a bit of bus 12 by the computer. It is also seen that each actuator module on each card is connected by lines to the outputs of gates 29 and 30 are to the outputs of gates 31 and 32.

With respect to the set of lines generally indicated at 37 connected to the outputs of gates 30 and the unnumbered set of lines connecting the outputs of gates 32 to the set of lines 37 they actually extend to four inputs of a 4-line-to-16-line decoder/demultiplexer 39 (SN74154) as seen in FIG. 3. The decoder/demultiplexer 39 is actually mounted on information interface card 20.

The gates 30 are quadruple 2-input positive-NAND gates (SN7401). The optical couplers generally indicated at 26 are four couplers that have the output of each connected to one input of each gate of gates 30 to receive computer binary module select signals. The four outputs of gates 30 are connected by the set of four lines generally indicated at 37 to these four inputs of decoder/demultiplexer 39. Each of the 16 outputs of decoder-demultiplexer 39 is connected to junction 35 having connections, each to a different actuator module, so that each output of decoder/demultiplexer 39 is connected to a different actuator module. For analog actuator modules it is feasible to provide two or three of the modules on the same card using the printed conducting lines on the printed circuit board of the card but in that case, of course, the connection to each module is from a different output of decoder/demultiplexer 39 as in the case of one module on different cards.

The gates 32 constitute four 2-input positive-NAND gates (SN7401) having (as seen in FIG. 3) their outputs connected to the set of lines 37 that connect the outputs of gate 30 to the inputs of decoder/demultiplezer 39. The inputs of gates 32 are connected by lines (not numbered) on card 20 that are connected to pins (not numbered) that are connected to binary toggle switches of manual information entry station 38 to receive manually-entered module select binary information.

The gates 29 comprise three quadruple 2-input positive NAND gates (SN7401). Each gate has two inputs and one output. One of the inputs of each gate is connected to a different one of the 12 optical couplers generally indicated at 25 that receive 12-bit computer binary control information from bus 12. Each other input of gates 29 and gates 30 is connected to a line 41

(FIG. 3) to open these gates 29 and 30 when there is "1", i.e., a high, signal on line 41.

Referring to FIG. 3, the information interface card 25 is shown with one of 16 actuator module cards that are connected to different outputs of decoder/demultiplexer 39. The card shown in FIG,. 3 is an analog actuator module card 22 that is, like the other actuator module cards, a printed circuit board that has a number of printed conducting lines on it in a pattern in accordance with the type of module card. Mounted on card 22 are three synchronous 4-bit up/down binary counters 42, 43 and 44 that constitute one type of storage buffer means, that can be loaded at its outputs, when there is an appropriate signal to the load input of each of the counters, with signals corresponding to the signals at the inputs of the storage buffer means. The sets of 12 lines generally indicated at 36 are connected to different inputs of the twelve data inputs of counters 42, 43 and 44, each of these counters having four data inputs. Each of counters 42, 43 and 44 has borrow and carry outputs and down and up inputs. The down and up outputs of counter 42 are connected to the borrow and carry inputs of counter 43, respectively, by lines (not numbered). The down and up inputs of counter 43 are connected to the borrow and carry outputs, respectively, of counter 44 by lines (not numbered). To provide for a manual operation to change the count in counters 42–44, the down and up inputs of counter 44 are connected by lines (not numbered) to the outputs of NAND gates 45 and 46, respectively (SN7401), each by lines (not numbered). The gates 45 and 46 are also mounted on card 22. One input of gate 45 and one input of gate 46 are connected by a printed conducting line (not numbered) on card 22 to a pin (not shown) to which is connected a line 48 that extends to a pin (not shown) that connects line 48 to a printed conducting line (not numbered) on card 20 that is connected to one output of decoder/demultiplexer 39. The other input of each of NAND gates 45 and 46 is connected by a printed conducting line to different pins (not numbered) at the margin of card 22. These different pins are connected to a count down switch and a count up switch (not shown), that normally have their outputs grounded. The other inputs of gates 45 and 46 are connected to one output of decoder/demultiplexer 39 that provides a high level signal, if the computer has not selected that module, by the binary information placed at the inputs of decoder/demultiplexer 39, for entry of binary information to the outputs of counters 42–44. Thus, while the computer is not entering information into this module, the count in counters 42–44 can be changed.

To provide a count down, the count down switch is momentarily depressed to provide a high level pulse to the input of gate 45 connected to that pin. As a result, the output of gate 45 changes from a high level to a low level. There is one down count to counters 42–44 at the trailing edge of this low level pulse provided at the output of gate 45. At the end of the high level pulse provided by the count down switch, the output of gate 45 reverts to a high level signal. To provide a count up, the count up switch is momentarily depressed to provide a high level pulse to the input of gate 46 connected to that pin. As a result, the output of gate 46 changes from a high level to a low level. There is one up count to counters 42–44 at the trailing edge of this low level pulse provided at the output of gate 46. At the end of the high level pulse provided by the count up switch, the output of gate 46 reverts to a high level signal. It can be seen that the computer can lock out this manual operation by changing the signal at the output of decoder/demultiplexer 39 so that the output of both gates 45 and 46 remain as high level signals at both the down input and up input of counter 44. The operation of either switch does not change the output of gate 45 or 46 during this time.

That pin on card 20 that is connected to that output of decoder/demultiplexer 39 is also connected to a line 49 that is connected to another pin (not shown) on card 22. The latter pin on card 22 is connected by a printed conducting line on card 22 to the input of an inverter 50 (SN7405) mounted on card 22. The output of inverter 50 is connected to one input of a NAND gate 51 (SN7401). The other input of gate 51 is connected by a printed conducting line (not numbered) to a pin (not shown) that is connected to a line 53. The optical coupler 24 has its output connected to this input of gate 51 by one of sixteen lines 53. The other 15 of lines 53 are not shown but each is connected to one input of a gate 51 on a different one of the other 15 actuator modules.

To provide this connection of each of lines 53 to the output of optical coupler 24, all of lines 53 are connected to the output of a buffer/driver 54 (SN7407) that has its input connected by a line 55 to the output of optical coupler 24. Connected to line 55 is also a line 56 that is connected to a switch 57 that is manually operated momentarily to provide a high pulse to the input of buffer/driver 54 and from its output a high pulse by line 53 to one input of gate 51. Because there is a low signal in line 49, that is inverted by inverter 50 to provide a high signal to the other input of gate 51, there is a low signal to the load inputs of counters 42–44. As a result, there is an entry of data into counters 42–44. The same loading occurs if there is a high execute pulse provided by the computer to optical coupler 24 if there is a low signal in line 49 of the actuator module of card 22. That signal in line 49 is provided for a computer operation by the appropriate binary information provided by bus 12 to gates 30 that are enabled by a signal from device selector means 17, as described below. That low signal in line 49 for a manual operation is provided if gates 32 are enabled and the information at the four inputs of gates 32, one input to each gate, provides binary information to decoder/demultiplexer 39 such as that the output connected to line 49 is changed from high to low.

The device selector means 17 provides a low signal at its output connected to line 18, if the computer control system being described is selected by the computer to enter binary information placed in bus 12 by the computer. In that case there is a low signal on line 18 and during this time there is a high pulse provided to optical coupler 24. The line 18 is connected to the input of an inverter 58 that is mounted on information interface card 20. The output of inverter 58 (SN7405) is connected by a line (not numbered) to the input of a buffer/driver 59 (SN7407) that has its output connected to line 41. As a result, the low signal on line 18 is inverted by inverter 58 to provide a high signal to gates 29 and 30 to open these gates for the transfer of computer binary control information from optical couplers 25 and computer binary select information from optical couplers to the data inputs of counters 42–44 and to the data inputs of decoder/demultiplexer 39, respectively.

To the line connecting the output of inverter 58 to the input of buffer/driver 59 is connected a line (not numbered) that is connected to another inverter 60 that is also mounted on card 20. The output of inverter 60 is connected by a line 61 that is connected to the second input of each gate of gates 31 and gates 32. As a result, there is a low signal at these second inputs of these gates when there is a high signal to the second inputs of gates 29 and gates 30. Accordingly, when gates 29 and 30 are enabled to be opened by the high signal on line 41 the gates 31 and gates 32 are not enabled. Thus gates 31 and gates 32 are locked out during the time that gates 29 and gates 30 are opened. However, gates 31 and gates 32 are opened when line 61 is provided with a high signal. This occurs when there is a high signal on line 18. This is the normal condition, when the computer is not addressing the computer control system by providing binary information to selector means 17 to obtain a low signal at its output that is connected to line 18.

As seen in FIG. 3, the gates 31 and 32 are connected by lines to pins to which are connected binary toggle switches (not shown) of manual information entry station 38 that provide binary control information to the three sets of gates 31 and provides binary module select information to gates 32.

From the foregoing, it is seen that the data at the inputs of gates 28 or the inputs of gates 31 provide, when gates 29 or gates 31 are open, binary information to the data inputs of counters 42–44 and this binary information is loaded in the outputs of counters 42–44 if the load inputs are provided with a low signal by gate 51 as a result of an execute pulse to line 53 and the high signal at the output of inverter 50 resulting from a low signal in line 49 from one output of decoder/demultiplexer 39.

When the storage buffer means, that is chosen, e.g., for other actuator modules, is a number of bistable latches, such as 4-bit bistable latches (SN7475), the entry of the data at their inputs to provide the same signals at their outputs is accomplished to providing to the load input of each bistable latch a high signal, rather than the low signal that is provided to the load inputs of up/down counters 42–44. In the embodiment of actuator module card shown in FIG. 3, the counters 42–44 as the storage buffer means are used, instead of the 4-bit bistable latches, on the analog actuator module so that the count at the outputs can be changed by pulses, to count down or up, from NAND gates 45 or 46, respectively. This is done when it is desired to change the analog signal manually without utilizing manual information entry station 38 or to change the analog signal from card 22 that is determined by the computer that entered binary information to gates 29.

In any event, the outputs of counters 42–44 are connected to twelve inputs of a 12-bit D to A converter 64 that operates on binary information, being retained at the outputs of counters 42–44, to provide a differential analog signal by lines 65 and 66 to differential operational amplifier 67 of a voltage-to-current converter generally indicated at 68 that is mounted on card 22. The amplifier 67 is illustratively Model 184 sold by Analog Devices, Inc., Norwood, Mass. The output of amplifier 67 is connected to the base of an NPN-type transistor that is mounted on card 22 as a part of voltage-to-current converter 68. The collector of transistor 69 is connected to a pin (not numbered) to provide a milliampere output to a process controller set-point that illustratively varies between +10 to 50 ma. The emitter of transistor 69 is connected to another unnumbered pin to provide a +1 to 5v analog output signal at that pin. The output of emitter of transistor 69 is also connected to line 65 through a resistor 70 and is connected through another resistor 71 to a line, that is connected to line 66 and that is connected also to a common ground through a pin 72. That unnumbered pin and pin 72 are also connected to a device 73, not mounted on card 22, that provides a digital indication of the analog output signal.

Figure 4:
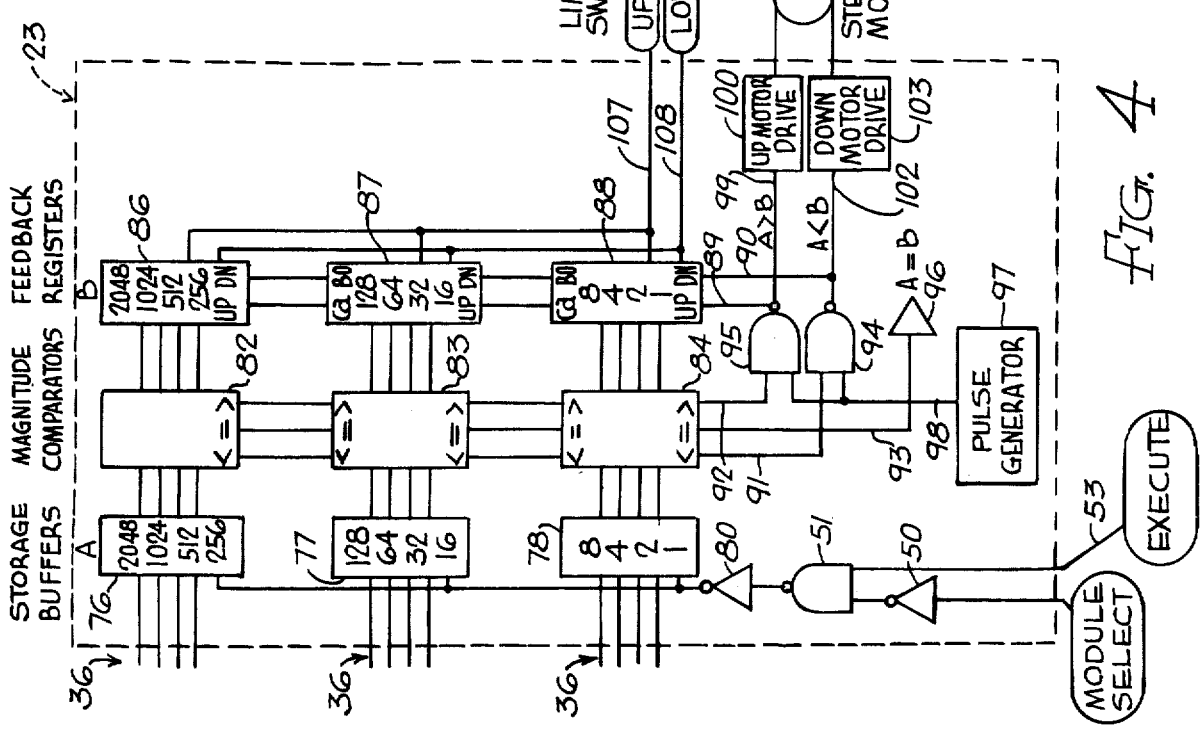
FIG. 4 is an electronic circuit diagram of a construction of a stepping motor actuator card that is another one of the alternative actuator cards used in the system of the invention.

FIG. 4 shows the construction of stepping motor actuator card 23. Instead of having three up/down counters 42–44, that are mounted on card 22 as the storage buffer means, three 4-bit bistable latches 76, 77 and 78 (SN7475) are mounted on card 23. The data inputs of these latches are connected to the sets of lines 36 on information interface card 20, as is the case for counters 42–44 of card 22. Thus binary information by the opening of gates 29 or gates 31 provide signals to inputs of latches 76–78. The card 23 has a number of printed conducting lines mounted on it for this purpose as well as other printed conducting lines.

As in the case of card 22, card 23 has NAND gate 51 having one of its inputs connected to a line 53 to receive the execute pulse either from the output of optical coupler 24 or manually-operated execute pulse switch 57. The other input of gate 51 is connected to the output of inverter 50 that has its input connected by a line to one of the outputs of decoder/demultiplexer 39. The latches 76–78 require a high signal at the load input of each to load signals at their outputs. Between the output of NAND gate 51 and these load inputs, an inverter 80, that converts the low signal from the output of NAND gate 51 to a high signal, and the output of inverter 80 is connected to the line on the board that is connected to these load inputs of latches 76–78. Thus the opening of gate 51 by the high signals to its inputs, based on the execute pulse or manual pulse from switch 57 and the high signal from the output of decoder/demultiplexer 39 to which inverter 50 of card 23 has its input connected, provides an entry of signals at the outputs of latches 76–78 corresponding to the signals at the inputs of these latches. When the execute pulse or manual pulse from switch 57 is terminated, the input to the load inputs of these latches changes to a low signal. When this occurs the output of latches 76–78 retain signals corresponding to the signals at the inputs of these latches at that moment of termination of the high signal to the load inputs.

Mounted on card 23 are 4-bit magnitude comparators 82, 83 and 84 (SN7485) that have two sets of data inputs. One set of the data inputs of magnitude comparators 82, 83 and 84 are connected by printed conducting lines (not numbered) to the four outputs of latches 76, 77 and 78, respectively. Also mounted on card 23 are three feedback registers 86, 87 and 88. Each of these registers is a synchronous 4-bit up/down binary counter (SN74193). Each of the feedback registers 86–88 has four outputs that are connected to the other set of four inputs of magnitude comparators 82–84, respectively, by other printed conducting lines (not numbered) on card 23. The up and down inputs of register 86 are connected to the carry and borrow outputs, respectively, of register 87 by printed conducting lines (not numbered). Similarly, the up and down inputs of register 87 are connected to the carry and borrow outputs respectively, of register 88 by printed conducting lines (not numbered). The up and down inputs of register 88 are connected to printed conducting lines 89 and 90.

Each of 4-bit magnitude comparators 82, 83 and 84 has three other inputs and three outputs. Each comparator performs a comparison of two 4-bit words (A and B). The three comparators 82-84 compare words of greater length by connecting the comparators in cascade. Each of the magnitude comparators have A<B, A>B, and A=B outputs and A<B, A>B and A=B inputs. These three outputs of comparator 82 are connected to the corresponding three inputs of comparator 83 and the three outputs of comparator 83 are connected to the corresponding inputs of comparator 84. The A<B, the A>B, and the A=B outputs of comparator 84 are connected to printed conducting lines 91, 92 and 93, respectively. The line 91 is connected to one input of a NAND gate 94 (SN7401) on card 23. The line 92 is connected to one input of a NAND gate 95 (SN7401) mounted on card 23. The line 93 is connected to an input of buffer/driver 96 that is on card 23 and that has its output connected to a light (not shown) at the location of the system that when lit indicates the data at the outputs of latches 76–78 equals the 4-bit word at the outputs of registers 86–88. Also mounted on card 23 is a pulse generator 97 that is connected by a line 98 to the second input of each of NAND gates 94 and 95 to provide high level pulses to these inputs of gates 94 and 95.

The feedback registers 86–88 have the binary information signals at their outputs that correspond to the data entered in the previous cycle of operation of the system using stepping motor actuator card 23. If the stepping motor, hereinafter described, is to be operated in one direction or the other direction to change the position of a traveling thermocouple moved by the operation of the stepping motor, the binary information (12-bit word) entered and retaining in the outputs of latches 76, 77 and 78 will be less than or greater than the binary information (12-bit word) at the outputs of registers 86, 87 and 88.

If the 12-bit word entered into and retained at the outputs of latches 76–78 is greater than the 12-bit word in registers 86–88, the cascaded comparators 82-84 provide a high signal to line 92 and thereby to the one input of NAND gate 95. While this signal is at that input, a pulse from generator 97 to the other input of gate 95 provides a low pulse to line 89 and thus to the up input of up/down counter register 88. If this change of the 12-bit word in feedback registers 86–88 is still lower than the 12-bit word at the outputs of latches 76–78, there is still a high signal on line 92 so that another pulse from generator 97 provides a pulse to the up count input of register 88. This continues until the 12-bit work in the registers 86-88 agrees with the 12-bit word entered at the outputs of latches 76–78. Each pulse at the output of NAND gate 95 provides a pulse by a line 99 connected to an up motor drive means 100 on card 23. The motor drive means 100 provides four pulses, for every pulse received, to provide one step of a rotation of a stepping motor 101 in one direction for an upward movement of the thermocouple (not shown) mounted in a thermowell of the process equipment.

If the 12-bit word entered into and retained at the outputs of latches 76–78 is less than the 12-bit word in registers 86–88, the cascaded comparators 82-84 provide a high signal to line 91 and thereby to the one input of NAND gate 94. While this signal is at that input, a pulse from generator 97 to the other input of gate 94 provides a low pulse to line 90 and thus to the down input of up/down counter register 88. If this change of the 12-bit word in feedback registers 86-88 is still higher than the 12-bit word at the outputs of latches 76-78, there is still a high signal on line 92, and so that another pulse from generator 97 provides a pulse to the down count input of registers 88. This continues until the 12-bit word in registers 86–88 agrees with the 12-bit word entered at the outputs of latches 76–78. Each pulse at the output of NAND gate 94 provides a pulse by a line 102 connected to down motor drive means 103 on card 23. Each pulse to drive means 103 results in four pulses from drive means 103 to provide one step of a rotation of a stepping motor 101 in the other direction for a downward movement of the thermocouple.

On the support for the thermocouple are two magnets that are provided to actuated a reed switch 105 or a reed switch 106 when the support and its thermocouple are moved to the desired upper limit of movement of the thermocouple or the desired downward movement of the thermocouple, respectively. The limit switch 105 is connected to a line 107 on card 23. The line 107 is connected to the load input of register 88. Other printed conducting lines provide a connection between the load input of register 86 and the load input of register 87 to line 107. The actuation of switch 105 to close it provides a low level signal to the load input of each of registers 86–88. This results at the leading edge of the low level signal in a loading of preset high level data to the four data inputs (not shown) of each of registers 86–88 so that each of their data outputs connected to comparators 82–84 are at the high level, i.e., A (the 12-bit word of latches 76–78) is less than B (the 12-bit word of outputs of registers 86–88). Thereby the high level signal in line 92 becomes a low level signal and the signal in line 91 becomes a high level signal so that pulses are provided by gate 94 to down motor drive means 103 for the reverse operation of motor 101 for a downward movement of the thermocouple and switch 105 opens.

When the low limit switch 106 is actuated, it closes to provide a high level signal to a line 108 that is connected to the clear input of register 88 and by other lines (not numbered) to the clear inputs of registers 86 and 87. At the leading edge of this high level signal all data outputs of registers 86–88 are forced to the low level. As a result A is greater than B so that the high level signal in line 91 becomes a low level signal and the low level signal in line 92 becomes a high level signal so that high level pulses are provided for an up count of registers 86–88 and to operate up motor drive means 100 and open switch 106.

Figure 5:
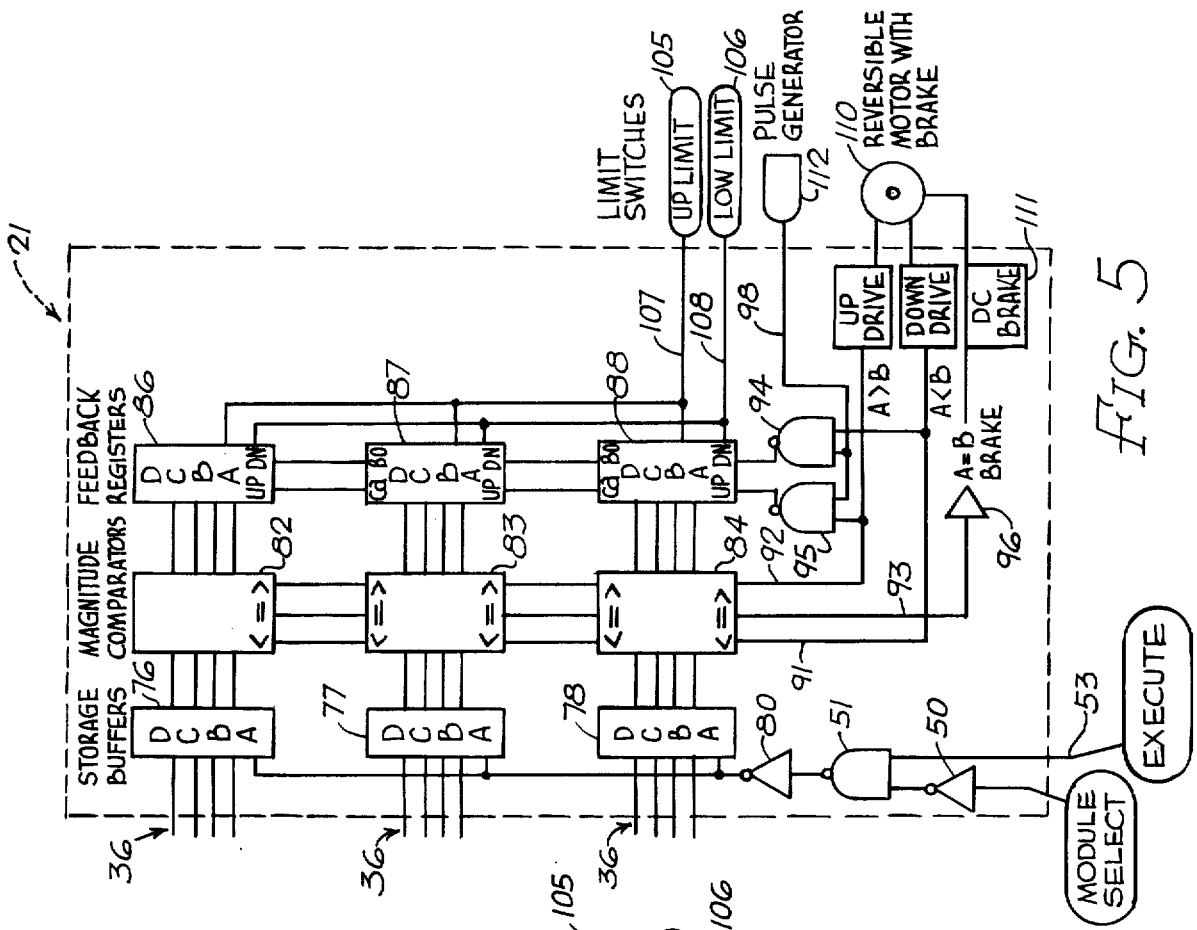
FIG. 5 is an electronic circuit diagram of another actuator module card, namely, a reversible motor actuator module card.

Referring to FIG. 5, the construction is generally the same as that shown in FIG. 4. As a result, the components and common printed conducting lines are assigned the same numbers and those components and lines require no further description. The actuator module card 21 that is connected to information interface card 20 differs from the card 23 by its use with a reversible motor 110 having a brake that is operated by a high level signal to a D.C. brake actuator means 111 that receives that signal via the output of inverter 96 from the A=B output of magnitude comparator 84 to stop motor 110. Instead of pulse generator 97 being mounted on card 21, as it is on card 23, the pulse generator 112 is operated by the rotation of motor 110 to provide pulses by line 98 connected to generator 112 and these pulses are thereby provided to the second input of gates 94 and 95.

Referring to FIG. 6, it shows an actuator module card 124, that is also connected to information interface card 20 by the sets of lines 36 and by a line 53 and a line (not numbered) that connect card 124 to buffer/driver 54 and one output of decoder/demultiplexer 39. As in the case of cards 21 and 23, card 124 includes latches 76, 77 and 78 that are connected to lines 36 and are loaded when there is a high level signal provided to their load inputs. This occurs when there is a high signal on line 53 to one input of gate 51 and there is a low signal in the line connected to one output of decoder/demultiplexer 39. That low level signal is inverted by inverter 50 that has its output connected to the other input of gate 51. This results in a low level signal to inverter 80 to provide at its output a high level signal to the load inputs of latches 76–78.

The card 124 has two hex buffer/drivers 125 (SN7407). The inputs of these inverters are connected to different outputs of latches 76–78. The output of each driver 125 is connected to a different printed conducting line of a set of lines (not numbered) that are connected to different devices 126, such as, relays, optical couplers, etc., that have for each an output and an input that are connected to pairs of conducting lines (not numbered) on card 124 to which are connected pins shown as circles on card 124 in FIG. 6 and not numbered. Various devices of the process equipment are connected to different pairs of these pins to be operated as a result of a signal from the associated output of drivers 125. That operation is determined by the signal on the associated bit of the binary information placed on the associated bit of bus 12 that provides computer binary control information to latches 76, 77 or 78, when gates 29 are open, for an output at that output of the outputs of latches 76-78 that provides the signal to the relay or optical coupler or the like that is connected to that output of the storage buffer means.

Of course, the latches 76–78 receive the binary control information placed on bus 12 when gates 29 are opened by the signal from the appropriate output of device selector means 17 and when the outputs of latches 76-78 enter and retain this information as a result of the signal from the associated output of decoder/demultiplexer 39 that is inverted by inverter 50, in combination with the execute pulse, that provides via NAND gate 51 and inverter 80 a high signal to the load inputs of latches 76–78.

From the foregoing description of cards 21, 22, 23 and 124 it is apparent that the loading of binary information in the outputs of the storage buffer means of cards 22, 23 and 124 can be accomplished by a manual entry of binary control information and the manual entry of module select binary information via gates 31 and gates 32 to the data input of the storage buffer means and to decoer/demultiplexer 39 as described earlier in connection with FIG. 3.

It is seen from the earlier description that the computer locks out any manual operation to select any actuator module card and to enter data into the storage buffer means by preventing the enabling of gates 31 and gates 32. This is prevented during a computer operation of the cycle of the system of the present invention. However, the system can be modified, as described below with reference to FIG. 7, to override the computer operation with respect to a particular module card. For this purpose a line 130 is connected to line 41 (FIG. 3). An inverter 131 has its input connected to line 130 and its output connected to a line 132. A pin 133 is connected to the other end of line 132. The lines 130 and 132 are printed conducting lines on card 20 and pin 132 is at the margin of card 20.

Reverting to FIG. 2, the system for a lockout of an entry of computer binary control information into an actuator module card is provided by manual information entry select means generally indicated at 135 that is connected to gate 28. As mentioned earlier, gate 28 is not actually on information interface card 20 and gate 28 actually constitutes a number of circuitries, each including at least one gate. Each of these circuitries is a part of an actuator module on an actuator module card. In card 22 (FIG. 3) the circuitry for the analog actuator module on that card includes gate 51 and inverter 50 to provide a low level pulse to the load inputs of up/down counters 42–44 of the storage buffer means of that actuator module. In actuator module cards 21, 23 and 124 the circuitry to constitute gate 28 (FIG. 2) comprises gate 51, inverter 50 and inverter 80 to provide a high level pulse to the load input of latches 76–78 (FIGS. 4–6) of the storage buffer means of the actuator module on each of these cards. Each of these load pulses, when provided, to the actuator module on the particular card provides for an entry of the binary control information from the computer via information interface card 20 if that module is selected by the proper computer binary module select information. In the embodiment shown in FIGS. 3–6, the circuitry that constitutes gate 28 as described above is not capable, without modification, of locking out the entry of binary control information from the computer to the actuator module on any of these cards. Accordingly, without modification the embodiments do not include a use of manual information entry select switch 135.

Figure 7:
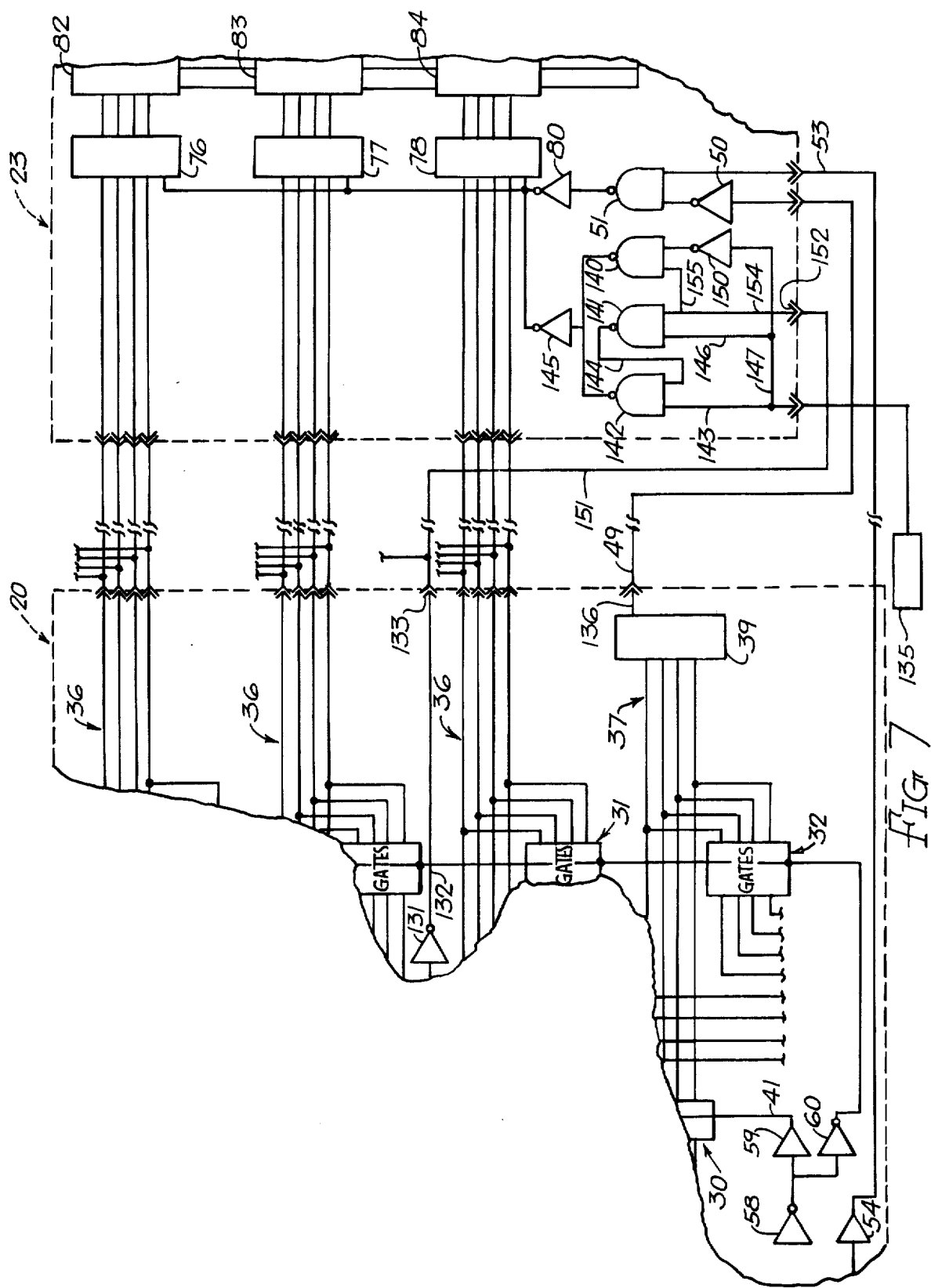
FIG. 7 is a fragmentary electronic circuit diagram of the system showing a part of the interface card and a part of the actuator card of FIG. 4 to illustrate an embodiment of circuitry to lock out, if desired, the computer entry of binary information to that actuator card.

To provide for the lockout of binary control information from the computer, in the actuator module of the invention, such as illustrated by the modules on cards 21, 22, 23 and 124, this circuitry constituting gate 28 is modified and connected to manual information entry select switch 135. This modification is illustrated for the module of card 23 as shown in FIG. 7. The same modification of the circuitry would be used for the actuator modules of cards 21 and 124. Essentially, the same modification of the circuitry is used for the module of card 22 except for the addition of an inverter to the OR'd output of a couple of inverters, as described later.

In the system of FIG. 7, decoder/demultiplexer 39 is actually mounted on information interface card 20, as stated earlier for FIGS. 3–6. One of its outputs is connected to inverter 50 on card 22. This connection is by a line 136 connected to that output of decoder/demultiplexer 39. The line 136 is connected to a pin (not numbered) on card 20 and it is connected to a socket (not numbered) connected to one end of line 29 extending between card 20 and card 23. The other end of line 49 is connected by a socket (not numbered) to a pin (not numbered) on card 23 that is connected to the printed conducting lines on card 23 to which the input of inverter 50 is connected. When that module is selected there is a low level signal at that output of decoder/demultiplexer 39 that is inverted by inverter 50 to provide a high level output signal to one input of gate 51. The other required high level signal to the other input of gate 51, to provide a low level output signal from gate 51, is provided by the computer execute pulse placed on one bit of bus 12 or by the manual execute pulse provided by manually-operated switch 57. The computer-provided execute pulse is passed from bus 12 to optical coupler 24 on card 20 and from it to buffer/driver 54 and thence to line 53 for connection as shown to a printed conducting line on card 23 that is connected to the other input of gate 51. The switch 57 is located at the site of the process equipment with other switches 57 and switch 57 is connected to the input of driver 54.

The modification includes three NAND gates 140, 141 and 142 (SN7401) on card 23. The manual information entry select switch 135 is a switch provided for each actuator module for which it is determined there should include provision for the computer lockout. The switch 135 is connected by conducting lines, including printed conducting lines 143, on card 23, to one input of gate 142. The other input of gate 142 is connected by a printed conducting line 144 to the output of gate 141. The output of gate 142 is connected to the input of an inverter 145 that has its output connected to the printed conducting line connected to the output of inverter 80. That line connected to the output of inverter 80 is connected by other lines to the load inputs of latches 76-78 that require a high level pulse to enter and retain at the output of these latches binary data corresponding to the binary information on lines 36 at the time of the change back to a low level signal at the load inputs.

The one input of gate 141 is connected by a printed conducting line 146 to a printed conducting line 147 that is connected to line 143. The line 147 is connected also to the input of an inverter 150 that has its output connected to one input of gate 140.

As seen in FIG. 3, line 41 on card 20 has a high level signal when device selector means 17 provides a low level signal to line 18. This occurs when the system is selected to receive a binary information on bits of the information output channel of bus 12. When the computer is not providing binary information for this system there is a high level signal on line 18; as a result, there is a low level signal on line 41 so that gates 29 and 30 are not enabled. Because inverter 131 is connected to line 41, as described earlier, there is a low level signal at the output of inverter 131 when the computer is active, i.e., has selected the system for entry of binary control information. When the computer is not providing this operation there is a high level signal at the output of inverter 131.

The inverter 131 has its output connected, as shown in FIG. 7, by printed conducting line 132 and pin 133 on card 20, by a line 151 having sockets (not numbered) connected to pin 133 and a pin 152 on card 23 connected to a printed conducting line 154 on card 23 to the outer input of gate 141. A line 155 is connected to line 154 on card 23 and to the other input of gate 140. The output of gate 140 is also connected to the line that connects the output of gate 142 to the input of inverter 145.

For this modified construction of gate 28 that constitutes gates 140-142 as well as gate 51 and inverters 80, 145 and 150, with the connections as described above, it is necessary that switch 135 provide a high level signal for latches 76-78 to a load and retain computer binary control information into the data outputs of these latches, if that actuator module is selected for an entry of the information. If switch 135 provides a low level signal via line 143 to one input of gate 142, the end result is that the signal to the load inputs of latches 76-78 is a low level signal; thus there is a lockout of the computer entry and retention of the control information to the outputs of latches 76-78. The function of this circuitry is described below.

When the system is selected by the computer there is a low level signal on line 154 to one input of gate 141. This signal indicates that the computer is actively providing an operation of the system. When the actuator module of card 23 is selected by the proper computer binary module select information, that information is processed by the decoder/demultiplexer 39 so that the input of gate 51 receives a high level signal. This occurs while the other input of gate 51 receives a high level execute pulse. Then the output of gate 51 provides a low level pulse to the input of inverter 80 that provides a high level output pulse. However, the signal to the load inputs of latches 76-78 is not a high level pulse unless the output of both inverters 80 and 145 are at a high level, because the outputs of these inverters are wired OR.

If switch 135 is providing a high level signal to line 143 and thereby to one input of gate 142, that signal is also provided to one input of gate 141. That signal, after it is inverted, also is provided as a low level signal to one input of gate 140. When the computer is providing the binary information to provide the high level signal to one input of gate 51, by inverting a low level signal using inverter 50, the signal provided by line 154 to the outer input of gate 141 is a low level signal, so that the output signal of gate 141 to the second input of gate 142 is a high level signal, whereby there is a low level signal provided at the output of gate 142. At the same time, the low level signal on line 154 and the low level signal at the other input of gate 140 from inverter 150 provide a high level output signal. The low level output signal of gate 142 controls so that the output of inverter 145 is high level. This occurs while the output pulse of inverter 80 is a high level output pulse, as described earlier. As a result, the load inputs of latches 76-78 are enabled to load the computer binary control information at their outputs and retain these data when the execute pulse on line 53 is terminated.

In the event that switch 135 has been positioned so that it provides a low level signal to line 143 and thereby to one input of gate 142 and by line 146 to one input of gate 141 for a high level output signal of gate 141 to the other input of gate 142, there is a high level output signal from gate 142. The low level signal from switch 135 provides by inverter 150 a high level signal to one input of gate 140 but there is a high level output signal from gate 140 because the other input of gate 140 is provided with a low level signal by lines 154 and 155. Thus the outputs of gates 140 and 142 provide high level output signals to inverter 145. This results in a low level output signal from the inverter 145 and provides a low/level output signal to load inputs of latches 76-78, even though the output pulse from inverter 80 is a high level output pulse. Accordingly, the data outputs of latches 76-78 retain the data entered previously. This binary information at the outputs of latches 76-78 can be entered by previous manual operation during any time that the computer is not operating on any of the actuator modules of the system.

This manual entry of binary information using manual information entry station 38 to provide first binary information to select this actuator module on card 23 and to provide second binary information to be entered and retained in the outputs of latches 76–78 is provided as follows. At that time line 61 has a high level signal to open gates 31 and gates 32, so that the first binary infromation from station 38 is passed by gates 32 to the inputs of decoder/demultiplexer 39 to provide a low/-level signal to inverter 50 for a high level signal to one input of gate 51. At the same time the second binary information is passed by gates 31 to the data inputs of latches 76–78. The other input of gate 51 receives a high level pulse by the momentary operation of switch 57. As a result, there is a low level output signal provided by gate 51 to inverter 80 to provide a high level pulse at the output of inverter 80 that provides a high level pulse to the load inputs of latches 76–78 if the output of inverter 145 is providing a high level signal. This is the case because gate 140 is providing a low level signal at its output even though the output of gate 142 is providing a high level signal. This is the signal at the output of gate 140 because the signal on line 154 and thereby on line 155 to one input of gate 140 is a high level signal and the signal at the other input is also a high level signal because the low level signal on lines 143 and 147 is inverted by inverter 150. At that time there is a high level signal on line 154 to one input of gate 141 but there is a low level signal on line 146 to the other input of gate 141 due to the fact that switch 135 is providing a low level signal to line 143. This results in a high level signal on line 144 to one input of gate 142 but the low level signal provided to the other input of gate 142 by line 143 results in a high level signal at the output of gate 142; however, the low level signal from gate 140 to inverter 145 controls. Accordingly, the outputs of both inverters 80 and 145 are high level signals so that the load inputs of latches 76–78 are enabled for the entry at their outputs of the second binary information from manual information entry station 38 that is retained at these outputs when the pulse from switch 57 terminates.

When the load input of the storage buffer means requires a low level signal or pulse for the entry and retention at the data outputs of binary information at their data inputs, the circuitry shown in FIG. 7 is modified by adding an inverter to the OR'd output of inverters 80 and 145.

In the foregoing description of FIGS. 4 and 5, limit switches 105 and 106 and their function to provide high level signals and low level signals, respectively, at the data outputs of feedback registers 86–88 have been described. These limit switches in combination with feedback registers 86–88 and circuitry other than comparators 82–84 and latches 76–78 can provide for a continuous operation in which the two limit switches are repetitively actuated. In this case, for FIG. 4 the thermocouple is raised and lowered in a repetitive manner. With these switches 105 and 106 connected as shown in FIGS. 4 and 5, it is possible to reestablish the correct data output of registers 86–88 relative to the actual position reached by the operation of motor 101 or motor 110 at the time there is a failure of power to the system. When power is restored binary information is entered by a manual operation or by a computer control to latches 76–78 to provide particular signals at their data outputs. The lines 107 and 108 are also connected to pushbutton switches (not shown) so that the momentary pressing of one of these switches provides the signal obtained by actuation of corresponding switch 105 or switch 106. Dependent upon the general position of the device moved by motor 101 or motor 110, one of the pushbutton switches is momentarily actuated to load the data outputs of feedback registers 86–88 so that all of these outputs are forced to have either a high level signal or a low level signal that depends on which of the pushbutton switches is actuated. As a result, the feedback registers 86–88 are driven down or up, as the case may be, until the data output signals of feedback registers 86–88 agree with the data output signals of latches 76–78. It may be necessary to provide additional actuations of the same pushbutton switch to provide further positioning of the device so that when the two output data signals, mentioned above, agree these binary informations represent the actual position of the device. Of course, this procedure is followed for all of the other actuator modules. This system is then ready for further use.

The foregoing description has been presented solely for the purpose of illustration and not by way of limitation of the invention because the latter is limited only by the claims that follow.

We claim:

1. A computer control system, useful at a local area to translate digital control information from an online computer located at a remote area into operations of devices of process equipment at the local area and useful to translate digital control information provided by manual operation of an entry station at the local area, which comprises:

an information interface means including:
first gate means comprising a first set of gates, each gate having a first input and a second input and an output, said first inputs of said first set of gates being connectable to a first set of bits of a digital information output channel of a bus connected to the computer and at least some of these bits connected to additional systems, that are at the local area or at another area containing another process equipment and that are constructed to receive and use digital information from the computer;
second gate means comprising a second set of gates, each gate having a first input and a second input and an output, said first inputs of said second set of gates being connectable to a second set of bits of the digital information output channel of the bus connected to the computer and at least some of these bits connected to these additional systems;
first inverter means comprising a first inverter having an input and an output, said input being connectable to one output of a number of mutually exclusive outputs of a decoder/demultiplexer of device selector means that has the data inputs of the decoder/demultiplexer connected to a third set of bits of the digital information output channel of the bus to provide at that output of the decoder/demultiplexer a signal when particular digital information is placed on the third set of bits by the computer to select said system, instead of another system, to use digital information placed on the first and second sets of bits, and said output of said first inverter being connected to said second inputs of said first set of gates and of said second set of gates;
third gate means comprising a third set of gates, each gate having a first input and a second input and an output, said first input being connectable to a different output of a first set of outputs of a manually-operated entry station to provide digital information to said first inputs of said third set of gate means;

fourth gate means comprising a fourth set of gates, each gate having a first input and a second input and an output, said first inputs being connectable to a different output of a second set of outputs of the entry station to provide digital information to said first inputs of said fourth set of gates;

second inverter means comprising a second inverter having an input and an output, said output of said second inverter being connected to said second inputs of said third set of gates and of said fourth set of gates; and decoder/demultiplexer means comprising a decoder-demultiplexer having a number of data inputs, each connected to a different output of the gates of said second set of gates and to a different output of said fourth set of gates to provide at one of its number of mutually exclusive outputs a signal, that output being dependent upon the digital information provided at the data inputs of said decoder/demultiplexer of said decoder/demultiplexer means;

a number of actuator modules, each actuator module including:

storage buffer means having a set of data inputs corresponding in number to the number of outputs of said gates of said first set of gates, a corresponding number of data outputs and a load input, said storage buffer means being constructed to load and retain at said data output signals, corresponding to the data input signals of said storage buffer means, as a result of a signal to said load input of said storage buffer means, and each of said data inputs of said storage buffer means being connected to a different one of said outputs of said first set of gates and also connected to a different one of said outputs of said third set of gates;

gate means including:

a gate having a first input and a second input and an output, said output being connected to said load input of said storage buffer means; and an inverter having an input and an output, said output being connected to said first input of said gate of said actuator module and said input being connected to one output of said decoder/demultiplexer of said decoder/demultiplexer means, and said input of said inverter of each actuator module being connected to a different output of that decoder/demultiplexer; and means connected to at least one of said data outputs of said storage buffer means and responsive to the signals at said outputs of said storage buffer means to operate at least one device of the process equipment when there is a change in the signal provided to that device by at least one of said data outputs of said storage buffer means;

means to transmit an execute pulse to said second input of said gate of each actuator module, said means being connectable to another bit of the digital information output channel of the bus, that bit being connected to all other systems that are connected to at least some of the first set of bits and connected to at least some of the second set of bits of the digital information output channel of the bus, said additional bit having placed on it said execute pulse by the computer during the time that the first and second sets of bits have placed on them digital information by the computer; and switch means to provide a manual pulse when momentarily closed, said switch means being connected to said second input of said gate of each actuator module, said second inverter means providing a signal at the output of said second inverter to said second inputs of said third and fourth sets of gates to open those gates only when said output of said first inverter does not provide a signal to said second inputs of said first and second sets of gates that opens said first and second sets of gates.

2. The computer control system of claim 1 and further including as a part of said information interface means:

a first set of optical couplers, each having an input and an output, each of said inputs being connectable to a different bit of the first set of bits of the bus and each output being connected to a different first input of said first set of gates to provide the connection between said first inputs of those gates to the first set of bits when said inputs of said first set of optical couplers are connected to the first set of bits of the bus; and a second set of optical couplers, each having an input and an output, each of said inputs being connectable to a different bit of the second set of bits of the bus and each output being connected to a different first input of said second set of gates to provide a connection between said first inputs of those gates to the second set of bits when the inputs of said second set of optical couplers are connected to the second set of bits of the bus, and wherein said means connected to said second input of said gate of each actuator module includes an additional optical coupler, having an input and an output, said input being connectable to the another bit of the digital information output channel of the bus and said output of said additional optical coupler being connected to said second input of said gate of each actuator module.

3. The computer control system of claim 2 wherein:

said information interface means is an information interface card including a pattern of printed conducting lines on said information interface card, said lines including:

a first set of lines providing said connection between said outputs of said first set of optical couplers and said first inputs of said first set of gates;

a second set of lines providing said connection between said outputs of said second set of optical couplers and said first inputs of said second set of gates;

a third set of lines, each line being connected to a different output of said gates of said first set of gates;

a fourth set of lines, each line being connected to a different output of said gates of said second set of gates and each line connected to a different input of said decoder/demultiplexer of said decoder-demultiplexer means to provide said connection between it and said second set of gates;

a fifth set of lines, each line being connected to a different/first input of said gates of said third set of gates and each line being connectable to a different output of a first set of outputs of a manually-operated entry station to provide digital information to said first inputs of said third set of gates;

a sixth set of lines, each line being connected to a different output of said gates of said third set of gates and each connected to a different line of said third set of lines;

a seventh set of lines, each line being connected to a different/first input of said gates of said fourth set of gates and each line being connectable to a different output of a second set of outputs of the entry station to provide digital information to said first inputs of said fourth set of gates;

an eighth set of lines, each line being connected to a different output of said gates of said fourth set of gates and each line being connected to a different line of said fourth set of lines;

a ninth set of lines providing said connection between said output of said first inverter and said second inputs of said first set of gates and of said second set of gates;

a tenth set of lines providing said connection between said output of said second inverter and said second inputs of said third set of gates and of said fourth set of gates;

an eleventh set of lines, each line being connected to a different output of said decoder/demultiplexer of said decoder/demultiplexer means;

a first additional line connected to the output of said additional optical coupler; and a second additional line connected to said first additional line;

each of said number of actuator modules is an actuator module card that further includes a pattern of printed conducting lines on said actuator module card, said lines including:

a twelfth set of lines, each line being connected to a different input of said storage buffer means;

a thirteenth set of lines, each line being connected to a different output of said storage buffer means;

a third additional line connecting the output of said gate of said actuator module to the load input of said storage buffer means of the same actuator module;

a fourth additional line connecting the output of said inverter to said first input of said gate of the same actuator module;

a fifth additional line connected to said second input of said gate of said actuator module; and a sixth additional line connected to said input of said inverter of said actuator module, said system further including:

means to connect each of said lines of said third set of lines to different lines of said twelfth set of lines of each of said actuator modules;

means to connect each of said lines of said eleventh set set of lines to a different sixth additional line of said actuator module cards; and means connecting said first additional line to each of said fifth additional lines of said actuator module cards.

4. The computer control system of claim 3 and further including:

the bus having the digital information output channel with the first, second and third sets of bits and the another bit;

the device selector means having its inputs connected to said third set of bits of said channel of said bus and having one of its outputs connected to said input of said first inverter of said information interface means; and the manually-operated entry station having its first and second sets of outputs connected to said fifth and seventh sets of lines, respectively, and wherein said first and second sets of bits of said channel of said bus are connected to said inputs of said first and second sets of optical couplers, respectively, and said another bit is connected to said input of said additional optical coupler.

5. The computer control system of claim 3 wherein said means connected to at least one of said data outputs of said storage buffer means, of at least one of said actuator module card, comprises:

a multi-bit digital-to-analog converter having a number of data inputs, each connected to a different line of said thirteenth set of lines, and having differential outputs; and a voltage-to-current converter connected to said differential outputs of said digital-to-analog converter and having a current output annd an analog signal output for use by a process controller.

6. The computer control system of claim 5 wherein:

said storage buffer means, of at least one of said actuator cards comprising said digital-to-analog converter and said voltage-to-current converter, includes at least a first synchronous multi-bit up/down counter to receive a group of the least significant bits of the digital information at its data inputs and a second synchronous multi-bit up/down counter to receive a group of the next most significant bits of digital information at its data inputs, said twelfth set of lines being connected to different inputs of said data inputs of said first and second up/down counters, said first and second up/down counters having data outputs and each having a load input, said first up/down counter having a down input and an up input and a borrow output and a carry output, and said second up/down counter having a down input and an up input connected to said borrow output and carry output, respectively, of said first up/down counter;

said third additional line connecting the output of said gate of said actuator module to the load input of said storage buffer means connects that gate to said load inputs of said first and second up/down counters;

said thirteenth set of lines are connected to different data outputs of said first and second up/down counters, each line being connected to a different input of said digital-to-analog converter; and said actuator module card comprising said first and second up/down counters as said storage buffer means further includes:

a pair of gates, each having a first input and a second input and an output, one of said outputs of said pair of gates being connected to the down input and the other output of said pair of gates being connected to the up input of said first up/down counter, and both of said first inputs of said pair of gates being connected to said sixth additional line connected to said input of said inverter of that actuator module card;

a pair of printed conducting lines, each being connected to a different one of said second inputs of said pair of gates and connectable to a different switch means to provide a pulse to either said second input of said first gate or to the second input of said gate of said pair of gates.

7. The computer control system of claim 3 wherein said storage buffer means, of at least one of said actuator module card, comprises:
- first and second multi-bit latches, each having a load input, data inputs and data outputs, said load inputs being connected to said third additional line connecting the output of said gate of that actuator module to the load input of said storage buffer means, each of said data inputs of said latches being connected to different lines of said twelfth set of lines of that actuator module card, so that said data inputs of said first latch is connected to those lines of said twelfth set of lines containing the least significant bits of digital information on the twelfth set of lines and said inputs of said second latch is connected to those lines of said twelfth set of lines containing the next most significant bits of digital information on the twelfth set of lines,
- said actuator module card containing said latches as said storage buffer means further including:
- an additional inverter having its input connected to said output of said gate of that actuator module card and to said third additional line to invert the signal from that gate to the load inputs of said latches;
- first and second magnitude comparators, each having two sets of data inputs, greater-than, equal, and less-than inputs, greater-than, equal, and less-than outputs, said data inputs of said magnitude comparators being connected to a different line of said thirteenth set of lines to connect said one set of data inputs of said first and second magnitude comparators to said data outputs of said first and second latches, respectively, said greater-than, equal, and less-than outputs of said second magnitude comparator being connected to said greater than, equal, and less-than inputs of said first magnitude comparator, respectively;
- first and second synchronous multi-bit up/down counters, each having data outputs, up and down inputs, borrow and carry outputs, said data outputs of said first and second up/down counters being connected to said other set of data inputs of said first and second magnitude comparators, respectively; and
- first and second additional gates, each having a first input and a second input, said first additional gate having its output connected to said up input of said first up/down counter, said output of said second additional gate having its output connected to said down input of said first up/down counter, said first input of said first additional gate being connected to said greater-than output of said first magnitude comparator, and said first input of said second additional gate being connected to said less-than output of said first magnitude comparator; and
- said system further including, for use with that actuator module card, pulse-generating means connected to said second inputs of said first and second additional gates, said greater-than and less-than outputs of said first magnitude comparator being connectable to motor drive means for the movement by the motor of a device used in the operation or control of the process equipment.

8. The computer control system of claim 3 and further including:
- another inverter having its input connected to said first inverter of said information interface means and having an output;
- a number of manual information entry switches corresponding in number to those actuator modules that are to be able to function for a lockout of entry of digital information from the computer; and
- for each actuator module provided with said lockout of computer entry, the actuator module further includes: a set of first, second and third gates, each having an output and first and second inputs;
- an additional inverter having its input connected to the outputs of the first and third gates of said set of gates of said actuator module; and
- a still further inverter having its output connected to said first input of said first gate of said set of gates of said actuator module,
- said output of said inverter of said gate means of that actuator module and said output of said further inverter being OR'd connected to said third additional line of that actuator module, said first input of said second and third gates of said set of gates of said actuator module and said input of said still further inverter being connected to said manual information entry select switch for use with that module, said second input of said third gate being connected to said output of said second gate of said set of gates of that actuator module, and said another inverter, having its input connected to said output of said first inverter of said information interface means, being connected to said second input of said first and second gates of said set of gates of that actuator module.

9. The computer control system of claim 8 wherein said means connected to at least one of said data outputs of said storage buffer means, of at least one of said actuator module card, comprises:
- a multi-bit digital-to-analog converter having a number of data inputs, each connected to a different line of said thirteenth set of lines, and having differential outputs; and
- a voltage-to-current converter connected to said differential outputs of said digital-to-analog converter and having a current output and an analog signal output for use by a process controller.

10. The computer control system of claim 8 wherein said means connected to at least one of said data outputs of said storage buffer means, of at least one of said actuator module card, comprises:
- first and second multi-bit latches, each having a load input, data inputs and data outputs, said load inputs being connected to said third additional line connecting the output of said gate of that actuator module to the load input of said storage buffer means, each of said data inputs of said latches being connected to different lines of said twelfth set of lines of that actuator module card, so that said data inputs of said first latch is connected to those lines of said twelfth set of lines containing the least significant bits of digital information on the twelfth set of lines and said inputs of said second latch is connected to those lines of said twelfth set of lines containing the next most significant bits of digital information on the twelfth set of lines,
- said actuator module card containing said latches as said storage buffer means further including:
- an another inverter having its input connected to said output of said gate of that actuator module card and to said third additional line to invert the signal from that gate to the load inputs of said latches;

first and second magnitude comparators, each having two sets of data inputs, greater-than, equal, and less-than inputs, and greater-than, equal, and less-than outputs, said data inputs of said magnitude comparators being connected to a different line of said thirteenth set of lines to connect said one set of data inputs of said first and second magnitude comparators to said data outputs of said first and second latches, respectively, said greater-than, equal, and less-than outputs of said second magnitude comparator being connected to said greater than, equal, and less-than inputs of said first magnitude comparator, respectively;

first and second synchronous multi-bit up/down counters, each having data outputs, up and down inputs, borrow and carry outputs, said data outputs of said first and second up/down counters being connected to said other set of data inputs of said first and second magnitude comparators, respectively, and first and second additional gates, each having a first input and a second input, said first additional gate having its output connected to said up input of said first up/down counter, said output of said second additional gate having its output connected to said down input of said first up/down counter, said first input of said first additional gate being connected to said greater-than output of said first magnitude comparator, and said first input of said second additional gate being connected to said less-than output of said first magnitude comparator; and said system further including, for use with that actuator module card, pulse-generating means connected to said second inputs of said first and second additional gates, said greater-than and less-than outputs of said first magnitude comparator being connectable to motor drive means for the movement by the motor of a device used in the operation or control of the process equipment.

11. The computer control system of claim 10 and further including:
the bus having the digital information output channel with the first, second and third sets of bits and the another bit;
the device selector means having its inputs connected to said third set of bits of said channel of said bus and having one of its outputs connected to said input of said first inverter of said information interface means; and
the manually-operated entry station having its first and second sets of outputs connected to outputs of said third and fourth sets of gates, respectively, and wherein said first and second sets of bits of said channel of said bus are connected to said inputs of said first and second sets of optical couplers, respectively, and said another bit is connected to said input of said additional optical coupler.

12. The computer control system of claim 1 wherein:
said means connected to at least one of said data outputs of said storage buffer means, of at least one of said actuator module card, comprises:
a multi-bit digital-to-analog converter having a number of data inputs, each connected to a different data output of said storage buffer means and having differential outputs; and a voltage-to-current converter connected to said differential outputs of said digital-to-analog converter and having a current output and an analog signal output for use by a process controller;
said storage buffer means includes at least a first synchronous multi-bit up/down counter to receive a group of the least significant bits of the digital information at its data inputs and a second synchronous multi-bit up/down counter to receive a group of the next most significant bits of digital information at its data inputs, said outputs of said gates of said first set of gates being connected to different inputs of said/data inputs of said first and second up/down counters, said first and second up/down counters having data outputs and each having a load input, said first up/down counter having a down input and and up input and a borrow output and a carry output, and said second up/down counter having a down input and an up input connected to said borrow output and carry output, respectively, of said first up/down counter;
said output of said gate of said actuator module being connected to the load inputs of said first and second up/down counters;
said data outputs of said first and second up/down counters being connected to different inputs of said digital-to-analog converter.

13. The computer control system of claim 12 and further including:
the bus having the digital information output channel with the first, second and third sets of bits and the another bit;
the device selector means having its inputs connected to said third set of bits of said channel of said bus and having one of its outputs connected to said input of said first inverter of said information interface means; and
the manually-operated entry station having its first and second sets of outputs connected to outputs of said third and fourth sets of gates, respectively, and wherein said first and second sets of bits of said channel of said bus are connected to said inputs of said first and second sets of optical couplers, respectively, and said another bit is connected to said input of said additional optical coupler.

14. The computer control system of claim 1 wherein said storage buffer means, of at least one of said actuator module card, comprises:
first and second multi-bit latches, each having a load input, data inputs and data outputs, said load inputs of said latches being connected to the output of said gate of that actuator module, each of said data inputs of said latches of that actuator module card being connected to said outputs of said first set of gates so that said data inputs of said first latch is connected to those outputs of said first set of gates containing the least significant bits of digital information from the computer and said inputs of said second latch is connected to those outputs of said first set of gates containing the next most significant bits of digital information from the computer;
said actuator module card containing said latches as said storage buffer means further including:
an additional inverter having its input connected to said output of said gate of that actuator module card and to said load inputs of said latches to invert the signal from that gate to the load inputs of said latches;

first and second magnitude comparators, each having two sets of data inputs, greater-than, equal, and less-than inputs, and greater-than, equal, and less-than outputs, said data inputs of said magnitude comparators being connected to a different output of said outputs of said first and second latches, respectively, said greater-than, equal, and less-than outputs of said second magnitude comparator being connected to said greater than, equal, and less-than inputs of said first magnitude comparator, respectively;

first and second synchronous multi-bit up/down counters, each having data outputs, up and down inputs, borrow and carry outputs, said data outputs of said first and second up/down counters being connected to said other set of data inputs of said first and second magnitude comparators, respectively, and first and second additional gates, each having a first input and a second input, said first additional gate having its output connected to said up input of said first up/down counter, said output of said second additional gate having its output connected to said down input of said first up/down counter, said first input of said first additional gate being connected to said greater-than output of said first magnitude comparator, and said first input of said second additional gate being connected to said less-than output of said first magnitude comparator; and said system further including, for use with that actuator module card, pulse-generating means connected to said second inputs of said first and second additional gates, said greater-than and less-than outputs of said first magnitude comparator being connectable to motor drive means for the movement by the motor of a device used in the operation or control of the process equipment.

15. the computer control system of claim 14 and further including:

another inverter having its input connected to said first inverter of said information interface means and having an output;

a number of manual information entry switches corresponding in number to those actuator modules that are to be able to function for a lockout of entry of digital information from the computer; and for each actuator module provided with said lockout of computer entry, that actuator module further includes:

a set of first, second and third gates, each having an output and first and second inputs;

an additional inverter having its input connected to the outputs of the first and third gates of said set of gates of said actuator module; and a still further inverter having its output connected to said first input of said first gate of said set of gates of said actuator module, said output of said inverter of said gate means of that actuator module and said output of said further inverter being OR'd connected to said third additional line of that actuator module, said first input of said second and third gates of said set of gates of said actuator module and said input of said still further inverter being connected to said manual information entry select switch for use with that module, said second input of said third gate being connected to said output of said second gate of said set of gates of that actuator module, and said another inverter, having its input connected to said output of said first inverter of said information interface means, being connected to said second input of said first and second gates of said set of gates of that actuator module.

16. The computer control system of claim 15 and further including:

the bus having the digital information output channel with the first, second and third sets of bits and the another bit;

the device selector means having its inputs connected to said third set of bits and said channel of said bus and having one of its outputs connected to said input of said first inverter of said information interface means; and the manually-operated entry station having its first and second sets of outputs connected to outputs of said third and fourth sets of gates, respectively, and wherein said first and second sets of bits of said channel of said bus are connected to said inputs of said first and second sets of optical couplers, respectively, and said another bit is connected to said input of said additional optical coupler.

* * * * *

UNITED STATES PATENT AND TRADEMARK OFFICE
CERTIFICATE OF CORRECTION

PATENT NO. : 4,005,387

DATED : January 25, 1977

INVENTOR(S) : William M. Herring et al.

It is certified that error appears in the above-identified patent and that said Letters Patent are hereby corrected as shown below:

| | | |
|---|---|---|
| Column 4, | line 38, | "$\pm$5v" should read --+5v--. |
| Column 6, | line 22, | "are" should read --and--. |
| | Line 55, | "decoder/demultiplezer" should read --decoder/demultiplexer--. |
| Column 9, | line 28, | "28" should read --29--. |
| | Line 41, | "to providing" should read --by providing--. |
| Column 10, | line 3, | "5v" should read --5v DC--. |
| Column 11, | line 38, | "retaining" should read --retained--. |
| | Line 55, | "work" should read --word--. |
| Column 12, | line 8, | "registers 88" should read --register 88--. |
| Column 13, | line 58, | "decoer/demultiplexer" should read --decoder/demultiplexer--. |
| Column 14, | line 58, | "29" should read --49--. |
| Column 15, | line 39, | "a binary" should read --binary--. |
| | Line 56, | "outer input" should read--other input--. |
| | Line 65, | "a load" should read --load--. |
| Column 16, | line 31, | "outer input" should read --other input--. |
| Column 17, | line 5, | "infromation" should read --information--. |
| Column 18, | line 24, | "online" should read --on-line--. |
| Column 22, | line 19, | "annd" should read --and--. |
| Column 28, | line 35, | "bits and" should read --bits of--. |

Signed and Sealed this

Nineteenth Day of April 1977

[SEAL]

Attest:

RUTH C. MASON
Attesting Officer

C. MARSHALL DANN
Commissioner of Patents and Trademarks